R. SCHULTZ.
ICE-MACHINE.

No. 193,286. Patented July 17, 1877.

6 Sheets—Sheet 1.

Witnesses.

Inventor.
Robert Schultz.
Per A. Schücking
Attorney.

6 Sheets—Sheet 2.

R. SCHULTZ.
ICE-MACHINE.

No. 193,286. Patented July 17, 1877.

Witnesses,

Inventor:
Robert Schultz.
Per: A Schücking
Attorney.

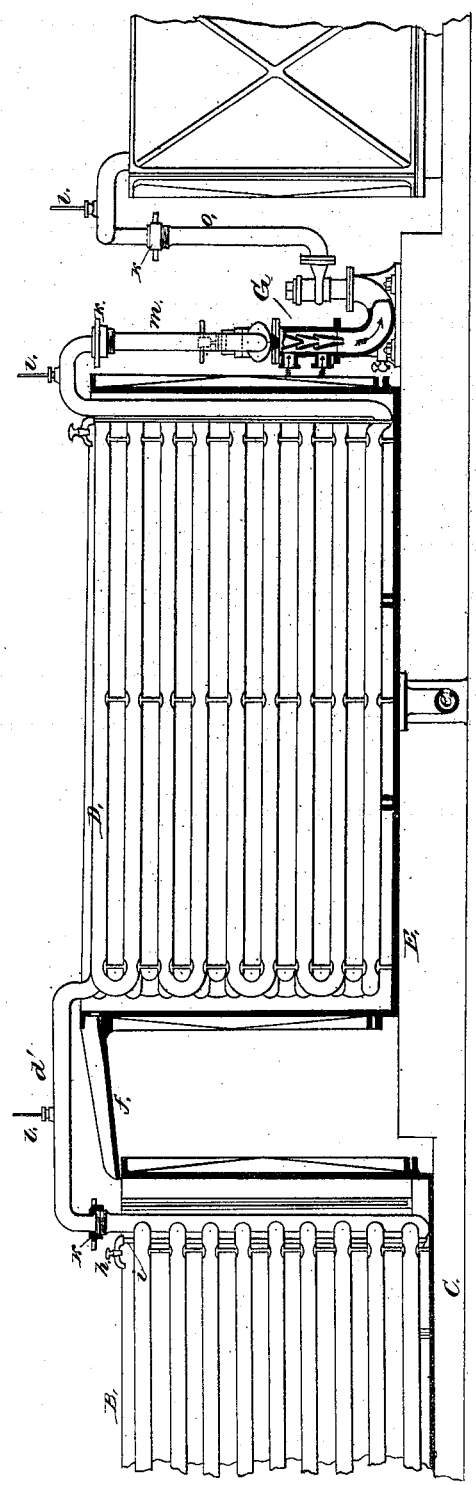

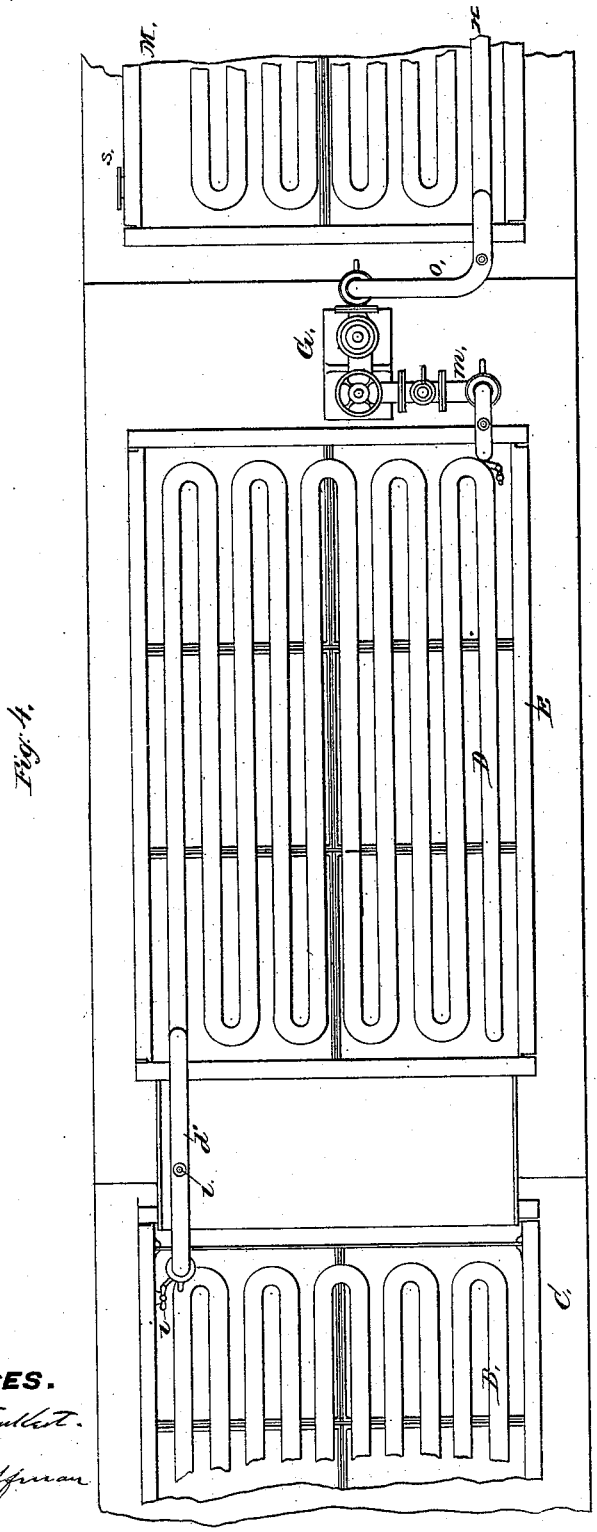

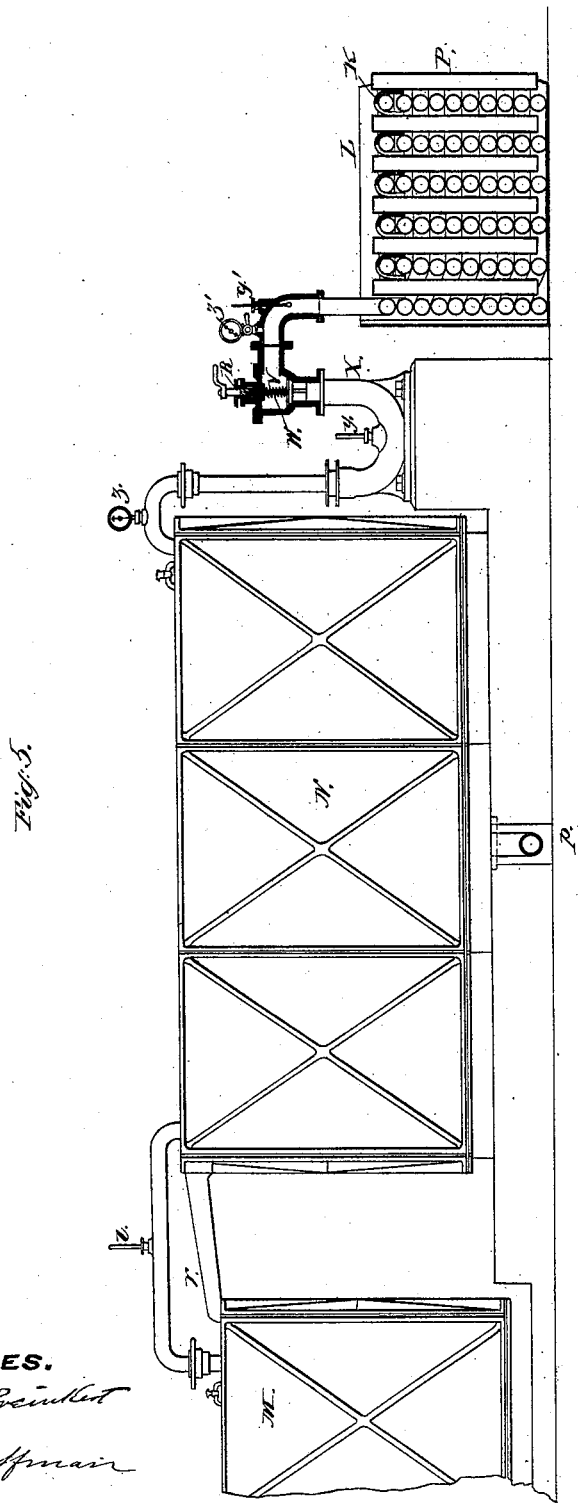

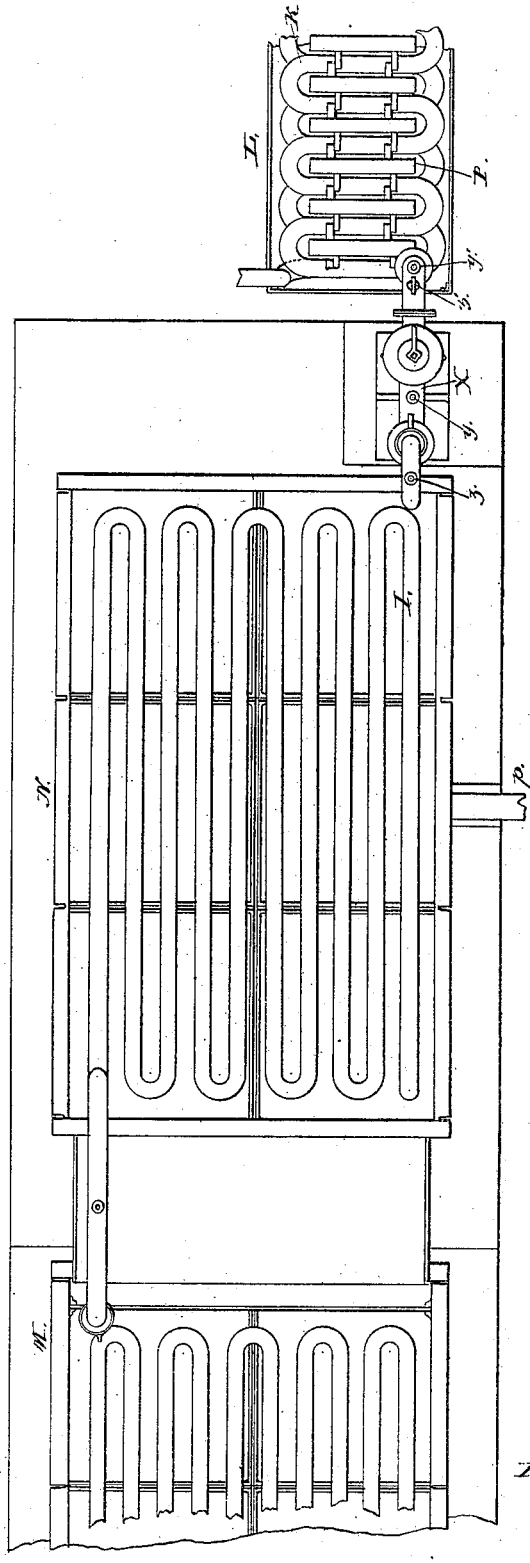

UNITED STATES PATENT OFFICE.

ROBERT SCHULTZ, OF SCHÖPPENSTEDT, GERMANY.

IMPROVEMENT IN ICE-MACHINES.

Specification forming part of Letters Patent No. 193,286, dated July 17, 1877; application filed March 19, 1877.

*To all whom it may concern:*

Be it known that I, ROBERT SCHULTZ, residing at the city of Schöppenstedt, in the Duchy of Brunswick, German Empire, have invented certain Improvements in Machines for Manufacturing Ice by means of Compressed Atmospheric Air, of which the following is a specification:

My invention relates to an apparatus for making ice, and for refrigerating purposes; and in its construction I utilize the well-known principle that air upon compression rises in temperature, and falls in corresponding ratio upon expansion.

The invention consists in the combination of an air-compressing pump, a series of water-tanks containing coils for the circulation of the compressed air, and an ordinary injector or siphon pump, which is so arranged, in connection with the air-pipe leading from the compressing-pump, that the air coming from said pump will, in passing through the injector, induce the entrance of an extra supply of atmospheric air, which is compressed, and subsequently expanded, together with the air compressed by the pump, as will be hereinafter more fully described.

Figure 1:
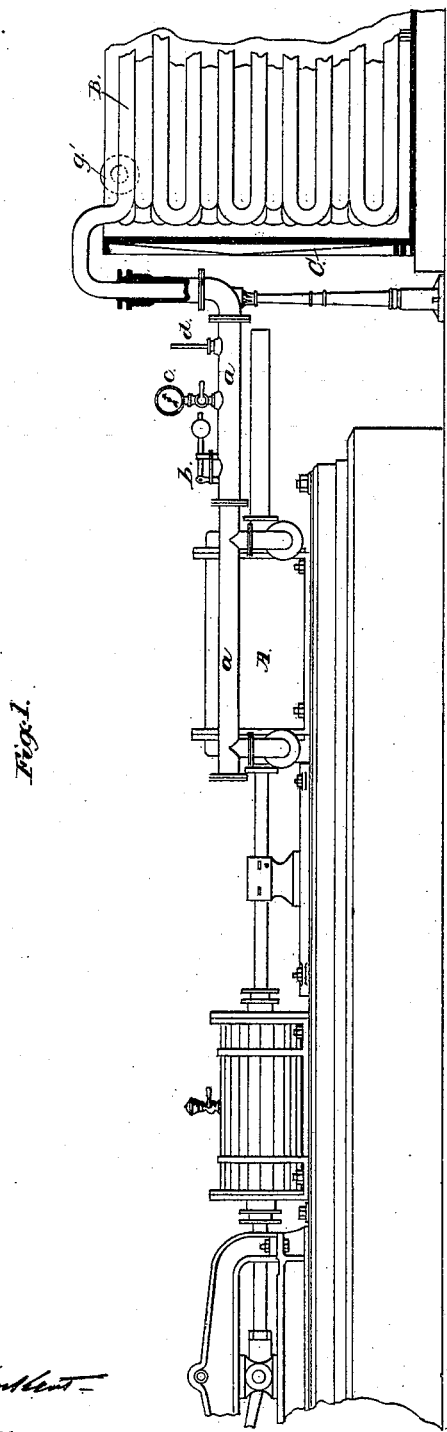
Figure 2:
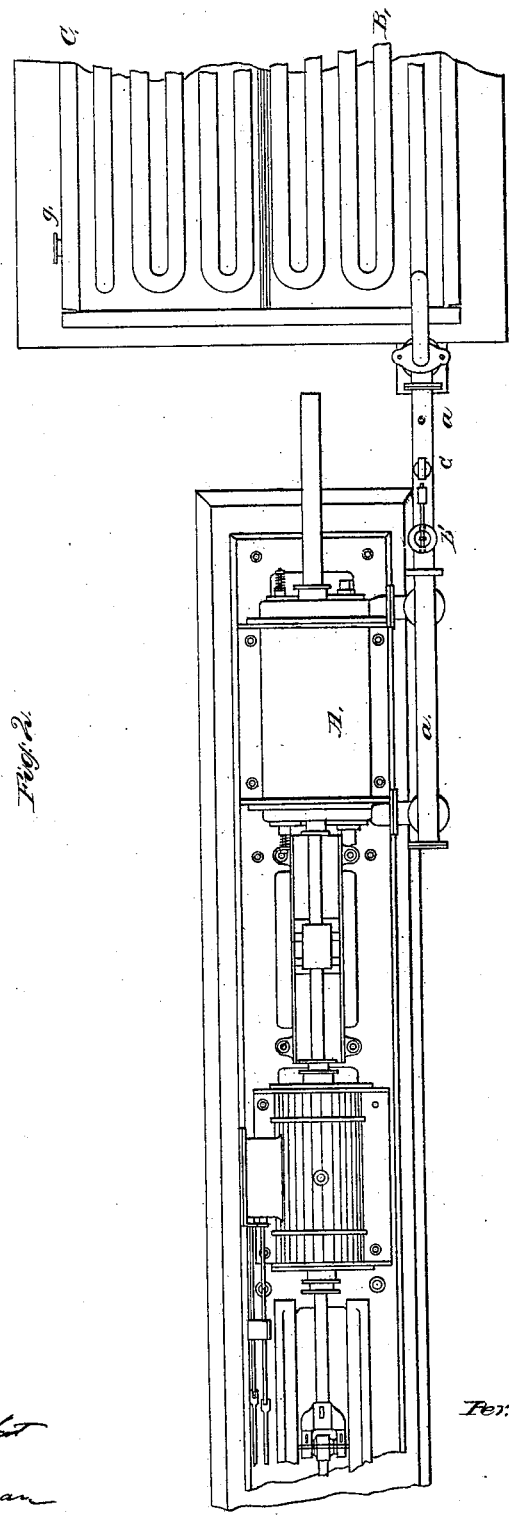

In the accompanying drawings, forming part of this specification, Figure 1 is a side elevation of the steam-engine, air-compressing pump, and first cooling-tank, with the latter in section. Fig. 2 is a top view of the same. Fig. 3 is a side elevation, illustrating the arrangement of the injector or siphon pump in relation to the cooling-tanks or air-pipes. Fig. 4 is a top view of the same. Figs. 5 and 6 are side and top views of the freezing-chamber and two cooling-tanks.

The double-acting air-compression pump A, illustrated in Figs. 1 and 2, is of any approved construction, and serves to compress air to a high degree of pressure. From the pump the compressed air passes through a pipe, $a$, into a cooling-worm or coil of pipe, B, in a tank, C, containing cool water. The air-conducting pipe $a$ is provided with an ordinary safety-valve, $b$, a manometer, $c$, and a thermometer, $d$, for relieving the pipe of excessive air-pressure, and for indicating the density and temperature of the air passing from the compression-pump.

After the air has circulated through the worm B it is conveyed by a pipe, $d'$, into a second worm, D, into whose tank E the cooling-water is admitted by a pipe, $e$, at the bottom of the same. The water fills the tank, and passes through the overflow-spout $f$ into the tank C, where it ascends around the worm B, and passes out through the waste-pipe $g$.

The cooling-worms B and D are each provided with a water-trap pipe, $i$, having a stop-cock, $h$, so that by opening said cocks the condensed water collected in the traps will be ejected by the compressed air. The different worms are also connected by means of suitable screw-coupling devices $k$, so that they can be readily disconnected for facilitating the cleaning or washing out of the same. A thermometer, $l$, is located at the point where the worms pass out of their tanks for indicating the temperature of the air.

After the compressed air has passed through the two cooling-worms, and still possesses a high degree of pressure, it enters, through the tube $m$, into an injector or siphon pump, G, which is of any known and approved construction. The jet of air coming from the compression-pump will, in its passage through the injector, cause the inflow of a current of atmospheric air, which mingles with the air-current from the pump, after which the entire supply of air passes through the copper pipe $o$ into a cooling-worm, H. The air, after having circulated through this worm and been further cooled, is conveyed into another cooling-worm, I, and subsequently it is passed into the worm K of the freezing-tank L, from whence it passes back again to the compression-pump through a return-pipe to be recompressed, and again circulates through the apparatus as before, thus making the operation continuous.

The worms H and I are placed in water-tanks M N, the latter of which receives the supply of water through the pipe $p$, and conveys it through the overflow $r$ into the tank M, having the waste-pipe $s$.

The freezing-tank L contains an aqueous solution of chloride of calcium, or other noncongealable fluid, into which the worm K is submerged, and between the coils of said worm are placed detachable copper boxes or freezing-molds P, containing the water to be frozen or congealed.

Between the water-tank M and the freezing-tank L is located a pressure-regulator, which can be set to admit compressed and cooled air into the worm K, at different degrees of pressure. The regulator consists of a valve, V, having a spring-encircled stem, W, which serves to close the air-inlet pipe X, when the pressure of the air coming from the worm I is not sufficient to raise the valve. A screw, R, made tight in the lid of the valve-casing, serves to vary the tension of the spring, so that the valve will open at different degrees of air-pressure. The temperature of the air is indicated in front and rear of the pressure-regulator by means of the thermometer $y\ y'$, while the manometer $z$ indicates the density of the compressed air, and $z'$ that of the expanded air.

When the apparatus is to be used for cooling chambers, cellars, hospitals, marine-vessels, mines, &c., the freezing or refrigerating tank is dispensed with, and the pipe X led directly into the chamber or room to be cooled.

It is a well known fact that atmospheric air upon compression rises in temperature, and falls in corresponding ratio upon expansion, and it is only necessary to state that any desired degree of coldness can be imparted to the air by passing it through the cooling-worms, and this air can either be used for congealing water to form ice, or be used for cooling purposes.

When the cooled and compressed air is passed through the coil of pipe in the freezing-chamber, it is expanded to atmospheric pressure, and abstracts heat from the metallic cases or molds containing the water, thus congealing the same, and becoming gradually warmed in itself, after which it is returned to the compression-pump and cooling devices.

While I am aware that ice-machines have been constructed in which refrigeration is produced by the expansion of compressed air, yet I am not aware that the jet or current of air coming from the compression-pump has been utilized for drawing in an extra supply of atmospheric air, through the medium of an ordinary injector or siphon pump, operated by compressed air.

The advantages of using an extra supply of air, obtained through the medium of an injector, can be briefly stated to consist in a saving of power to run the apparatus; also in the compression of said injected air by means of the air compressed by the pump.

An ice-machine constructed according to my invention is particularly adapted for use in breweries, as the water used for cooling the air, and warmed by the same, can be utilized for many purposes, thus effecting a saving of heating material.

Having thus described my invention, what I claim as new, and desire to secure by Letters Patent, is—

In an ice-machine or refrigerating apparatus, the combination of one or more air-injectors or siphon-pumps with an air-compression pump and cooling-worms, substantially as and for the purpose set forth.

In testimony whereof I have signed my name to this specification in the presence of two subscribing witnesses.

ROBERT SCHULTZ.

Witnesses:
GERARD WENZESLAUS V. NAWROCKI,
EDWARD P. MACLEAN.